United States Patent
Amin-Sanayei et al.

(10) Patent No.: US 9,447,214 B2
(45) Date of Patent: Sep. 20, 2016

(54) HIGH MELTING FLUOROPOLYMERS

(75) Inventors: Ramin Amin-Sanayei, Malvern, PA (US); Caiping Lin, West Hartford, CT (US)

(73) Assignee: Arkema Inc., King of Prussia, PA (US)

( * ) Notice: Subject to any disclaimer, the term of this patent is extended or adjusted under 35 U.S.C. 154(b) by 389 days.

(21) Appl. No.: 14/004,454

(22) PCT Filed: Mar. 15, 2012

(86) PCT No.: PCT/US2012/029168
§ 371 (c)(1),
(2), (4) Date: Sep. 11, 2013

(87) PCT Pub. No.: WO2012/125786
PCT Pub. Date: Sep. 20, 2012

(65) Prior Publication Data
US 2014/0005325 A1    Jan. 2, 2014

Related U.S. Application Data

(60) Provisional application No. 61/453,352, filed on Mar. 16, 2011.

(51) Int. Cl.
| | | |
|---|---|---|
| C08F 214/22 | (2006.01) |
| C08L 27/16 | (2006.01) |
| C08L 27/12 | (2006.01) |
| C08F 14/18 | (2006.01) |
| C08F 214/18 | (2006.01) |

(52) U.S. Cl.
CPC .......... *C08F 214/22* (2013.01); *C08F 14/18* (2013.01); *C08F 214/182* (2013.01); *C08L 27/12* (2013.01); *C08L 27/16* (2013.01); *Y10T 428/2982* (2015.01)

(58) Field of Classification Search
USPC .......................... 524/546; 526/255; 428/402
See application file for complete search history.

(56) References Cited

U.S. PATENT DOCUMENTS

| | | |
|---|---|---|
| 2,970,988 A | 2/1961 | Lo |
| 3,085,996 A | 4/1963 | Lo |
| 3,493,530 A | 2/1970 | Sianesi et al. |
| 5,490,931 A | 2/1996 | Chung et al. |
| 6,586,547 B1 | 7/2003 | Amin-Sanayei et al. |
| 6,818,258 B2 | 11/2004 | Kaneko et al. |
| 7,803,890 B2 * | 9/2010 | Samuels ................. C08F 14/18 526/252 |
| 7,811,359 B2 | 10/2010 | Tandon et al. |
| 2004/0260022 A1 | 12/2004 | Amos et al. |
| 2008/0078290 A1 | 4/2008 | Hagg et al. |
| 2008/0153977 A1* | 6/2008 | Samuels ............... C08F 259/08 525/53 |
| 2008/0171844 A1* | 7/2008 | Samuels ............... B60C 1/0008 526/255 |
| 2009/0301307 A1 | 12/2009 | Sugiyama et al. |
| 2010/0304270 A1 | 12/2010 | Amin-Sanayei et al. |
| 2011/0040021 A1 | 2/2011 | Kaspar et al. |
| 2011/0111156 A1* | 5/2011 | Durali .................. C08F 214/22 428/36.9 |
| 2011/0269911 A1 | 11/2011 | Morita et al. |
| 2013/0274420 A1 | 10/2013 | Morita et al. |

FOREIGN PATENT DOCUMENTS

| | | |
|---|---|---|
| JP | 7-18002 | 1/1995 |
| WO | WO 2010/005757 | 1/2010 |

* cited by examiner

*Primary Examiner* — Peter D Mulcahy
*Assistant Examiner* — Henry Hu
(74) *Attorney, Agent, or Firm* — Thomas F. Roland

(57) ABSTRACT

The invention relates to a method for making copolymers of 2,3,3,3-tetrafluoropropene and vinylidene fluoride by an emulsion polymerization process having unexpectedly high melting temperatures, even at low crystallinity levels. The invention involves adjusting the microstructure of the copolymers through a controlled polymerization to obtain controlled microstructure copolymers with unique properties, including those with high melting temperature and low crystallinity.

8 Claims, No Drawings

HIGH MELTING FLUOROPOLYMERS

This application claims benefit, under U.S.C. §119 or §365 of PCT Application Number PCT/US2012/029168, filed Mar. 15, 2012, and U.S. Provisional Application No. 61/453,352, filed Mar. 16, 2011.

FIELD OF THE INVENTION

The invention relates to a method for making copolymers of 2,3,3,3-tetrafluoropropene and vinylidene fluoride by an emulsion polymerization process having unexpectedly high melting temperatures, even at low crystallinity levels. The invention involves adjusting the microstructure of the copolymers through a controlled polymerization to obtain controlled microstructure copolymers with unique properties, including those with high melting temperature and low crystallinity.

BACKGROUND OF THE INVENTION

Vinylidene fluoride based polymers, collectively VDF-copolymers, are unique offering the widest possible range of processing options to obtain articles having the beneficial attributes associated with improved use temperature, chemical resistance associated with the high concentration of carbon fluorine bonds. Homopolymers of VDF offer high melting temperature of over 160° C., and even closer to 170° C. It is generally known that melting temperature diminishes as higher comonomer content is incorporated in to the PVDF backbone. This is expected in semi-crystalline polymers such as PVDF—since crystallinity generally decreases (along with melting temperatures) with increasing comonomer content. For example, U.S. Pat. No. 6,586,547 discloses that copolymers having more than about 30 wt % comonomer have zero crystallinity or no melting temperature.

Copolymers of VDF and hexafluoropropylene (HFP) show the expected relationship between comonomer content, crystallinity and inciting temperature. U.S. Pat. No. 3,051,677 describes batch emulsion and continuous emulsion processes for the copolymerization of vinylidene fluoride and 30 to 70 weight percent of hexafluoropropylene monomer. Under both sets of reaction conditions, relatively low crystallinity and low melting temperature is confirmed by the exemplified properties.

U.S. Pat. No. 3,178,399 describes both batch and continuous emulsion processes for preparing HFP-VDF copolymers having between 85 and 99 mole percent VDF and 1 and 15 mole percent HFP. Once again, the synthesis techniques described inevitably produce copolymers having relatively low melting temperature even at high crystallinity.

Polymers and copolymers of 2,3,3,3-tetrafluoropropene copolymerized with vinylidene fluoride are known in the art. The polymerizations can be carried out in a batch mode (U.S. Pat. No. 2,970,988, U.S. Pat. No. 3,085,996). They polymerization can also be carried out in a semi-batch mode (U.S. Pat. No. 6,818,258, U.S. Pat. No. 7,803,890, US 2008153977)—each of which disclose the ratio of the comonomers in the initial charge to be the same as the ratio of the comonomers in the delay feed. In WO10005757 the semi-batch polymerization process is disclosed having either the same initial charge and delay feed monomer ratios, or else a reaction charged initially only with VDF—leading to an initial production of PVDF homopolymer.

U.S. Pat. No. 2,970,988 discloses that the ratio of 2,3,3,3-tetrafluoropropene to VDF in the over-all polymer (initial charge in a batch reaction) determines the physical properties of the copolymer macrostructure.

The polymer chain microstructure of PVDF-based polymers relates to the crystalline and amorphous regions of the polymer. The relationship between the amorphous and crystalline regions, as well as the amount of crystalline phase, affect the mechanical properties of the copolymer and determine the ultimate applications for a given resin composition. At one end of the spectrum there are totally amorphous thermoplastic polymers and at the other extreme the highly crystalline polymers. The microstructure of the polymer chain determines the melting temperature at a given crystalline content. This attribute is controlled by the type and amount of the crystalline phase and copolymer microstructure.

It has now been found that while the overall ratio of the 2,3,3,3-tetrafluoropropene and VDF comonomers in the copolymer (macrostructure) is an important consideration, the microstructure of the copolymer can be adjusted to create a wide range of properties within the same overall comonomer ratio. This unexpectedly allows one to create copolymers that have a very high melting point with a low crystallinity, or a low melting point with high crystallinity from the same macrostructure monomer ratio.

One of the more interesting, and unexpected, controlled microstructure 2,3,3,3-tetrafluoropropene/VDF copolymers of the invention is that having a high melting temperature and high flexibility (low crystallinity), and the ultimate end uses of this group of copolymers. Since higher melting temperature is usually associated with higher crsyatllinity in semi-crystalline polymers, the creation of a high melting temperature polymer with low crystallinity is unexpected. The high melting point elastomer of the invention offers unique opportunities for end use applications. 2,3,3,3-Tetrafluoropropene/VDF copolymers with these properties are not known in the art, and provide fluorinated thermoplastic having a unique combination of properties including excellent flexibility, high melting temperature, high clarity, and solution stability.

SUMMARY OF THE INVENTION

The invention relates to a controlled microstructure copolymer composition comprising a copolymer having from 1 to 99 weight percent of 2,3,3,3-tetrafluoropropene monomer units and 1 to 99 weight percent of vinylidene fluoride monomer units wherein said copolymer is formed by a semi-batch process in which the ratio of 2,3,3,3-tetrafluoropropene to vinylidene fluoride in the initial charge is from 0.1 to 0.9 times, or from 1.1 to 10 times the steady state monomer ratio.

DETAILED DESCRIPTION OF THE INVENTION

The invention relates to copolymers of 2,3,3,3-tetrafluoropropene and vinylidene fluoride copolymer having a controlled microstructure. The microstructure is tailored, based on a specified difference between the ratio of the comonomers in the initial charge, and the ratio of the comonomers in the delayed feed. The delayed feed is generally added at a continuous rate following the initiation of the polymerization, although small amounts of the feed could be added in shots at given intervals.

By "copolymer" as used herein is meant a polymer containing 0.5 to 90 weight percent of 2,3,3,3-tetrafluoropropene monomer units and from 10 to 99.5 weight percent of vinylidene fluoride monomer units. Preferably the level of 2,3,3,3-tetrafluoropropene is from 2-60 weight percent. Copolymers, containing only 2,3,3,3-tetrafluoropropene and VDF are preferred.

The ratio of 2,3,3,3-tetrafluoropropene and vinylidene fluoride in the copolymer can range from 1 to 99% by weight, preferably 5-80% by weight, more preferably 15-65 of 2,3,3,3-tetrafluoropropene and 99 to 1% by weight, and preferably 95-20% by weight, and more preferably 85-35 wt percent vinylidene fluoride. The overall ratio of the comonomers effects the macrostructure of the copolymer, and has an influence on the physical properties of the copolymer. Surprisingly, it has been found that by controlling and tailoring the microstructure within a given macrostructure of the copolymer of the invention, a wide range of properties can be obtained. This control of the microstructure is accomplished by having an initial charge ratio between the comonomers that is different than the ratio of the monomers in the delay feed. The microstructure of the polymer relates to the amount, size, and distribution of the amorphous and crystalline regions of the semi-crystalline copolymer. The microstructure effect can be observed is the melting temperature of % crystallinity.

In addition to the 2,3,3,3-tetrafluoropropene and vinylidene fluoride monomers used for the copolymer, it is within the scope of the invention to include low levels of up to 10 weight percent based on the total monomer charge, of one or more other monomers, preferably fluoromonomers, to form a terpolymer. However, since additional monomers generally reduce the crystallinity, it is preferred that other monomers are not included in the polymer.

The ratio of the commoners in the initial feed is different than the ratio of the comonomers in the steady state—either a lower ratio of 2,3,3,3-tetrafluopropene/VDF in the initial charge of from 0.1 to 0.9 times the 2,3,3,3-tetrafluoropropene/VDF steady state ratio, or else a higher ratio of 2,3,3,3-tetrafluoropropene/VDF in the initial charge of from 1.1 to 10 times the 2,3,3,3-tetrafluoropropene/VDF steady state ratio. Both the initial charge and the delay feed contain both of the comonomers in the given ratio. It is outside the invention to have an initial charge consisting of only one of the monomers, as this leads to the initial formation of homopolymer.

In a preferred embodiment of the invention, the ratio of 2,3,3,3-tetrafluopropene/VDF in the initial charge of from 0.5 to 0.75 times the 2,3,3,3-tetrafluoropropeneNDF steady state ratio.

The vinylidene fluoride/2,3,3,3-tetrafluoropropene copolymers of the invention are conveniently made by an emulsion polymerization process, but suspension and solution processes may also be used. In an emulsion polymerization process, a reactor is charged with de-ionized water, water soluble surfactant capable of emulsifying the reactants and polymer during polymerization, and the reactor and its contents are deoxygenated while stirring. The reactor and contents are heated to the desired temperature and vinylidene fluoride, 2,3,3,3-tetrafluoropropene and, optionally, chain transfer agents to control copolymer molecular weight are added at the selected amount and ratio. When the desired reaction pressure is reached, an initiator is added to start and maintain the reaction.

The reactor used in the polymerization is a pressurized polymerization reactor, preferably a horizontal polymerization reaction, equipped with a stirrer and heat control means. The temperature of the polymerization can vary depending on the characteristics of the initiator used, but it is typically between 50° C. and 135° C., and most conveniently it is between 70° C. and 120° C. The temperature is not limited to this range, however, and might be higher or lower if a high-temperature or low-temperature initiator is used. The pressure of the polymerization is typically between 1380 and 8275 kPa, but it can be higher if the equipment permits operation at higher pressure. The pressure is most conveniently between 3450 and 5520 kPa.

Emulsifiers used in the polymerization are water-soluble and could be halogenated surfactants, especially fluorinated surfactants such as the ammonium, substituted ammonium, quarternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates.

Emulsifiers suitable for use in this invention are preferably non-fluorinated emulsifiers. The non-fluorinated emulsifiers include, but are not limited to:

i) non-ionic block copolymers with formula of

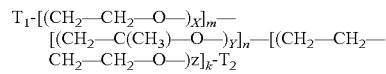

wherein, X, Y, and Z are between 2 to 200; and m, n, k are from 0 to 5, $T_1$ and $T_2$ are terminal groups selected from hydrogen, hydroxyl, carboxyl, ester, ether and/or hydrocarbon, and wherein said fluoropolymer is free of fluorosurfactants.

ii) alkyl phosphonic acids, polyvinylphosphonic acid, polyacrylic acid, polyvinyl sulfonic acid, and the salts thereat iii) alkanesulfonate selected from C7-C20 linear 1-alkanesulfonates, C7-C20 linear 2-alkanesulfonates, C7-C20 linear 1,2-alkanedisulfonates, and mixtures thereof;

iv) alkyl sulfate surfactants such as R—$SO_4$M, and $MO_4$S—R—$SO_4$M;

where R is a hydrocarbon group, and M is a monovalent cation selected.

Examples are sodium laurel sulfate, potassium laurel sulfate, ammonium laurel sulfate, and mixtures thereof.

The surfactant charge is from 0.05% to 5% by weight on the total monomer weight used, and most preferably the surfactant charge is from 0.1% to 2% by weight.

A paraffin antifoulant may be employed, if desired, although it is not preferred, and any long-chain, saturated, hydrocarbon wax or oil may be used. Reactor loadings of the paraffin may be from 0.01% to 0.3% by weight on the total monomer weight used.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonates are di (n-propyl) peroxydicarbonate, diisopropyl peroxydicarbonate, di (sec-butyl) peroxydicarbonate, and di (2-ethylhexyl) peroxydicarbonate, and di (2-ethylhexyl) peroxydicarbonate. The quantity of an initiator required for a polymerization is related to its activity and the temperature used for the polymerization. The total amount of initiator used is generally from 0.05% to 2.5% by weight on the total monomer weight used. Typically, sufficient initiator is added at the beginning to start the reaction and then additional initiator may be optionally added to maintain the polymerization at a convenient rate.

As the reaction progresses, a mixture of vinylidene fluoride and 2,3,3,3-tetrafluoropropene monomers is fed in a specified ratio that is different from the initial charge, and brings the total monomer to the steady state ratio of the comonomers. The monomers are fed to maintain reaction pressure. The feed of vinylidene fluoride, 2,3,3,3-tetrafluoropropene, and optionally initiator and chain-transfer agent is continued until the desired reactor fill is obtained. Following completion of the monomer feed the reaction is continued for a short time, about 10 to 20 minutes, then the reactor is cooled as quickly as possible. After reaching ambient temperatures, the unreacted monomers are vented and the latex produced by the reaction is drained.

The dispersion of the invention has a solids level of from 15 to 70 weight percent, preferably from 20 to 65 weight percent. The fluoropolymer particles in the dispersion have a particle size in the range of 50 to 500 nm, and preferably from 100-350 nm.

To obtain dry resin, the latex is coagulated by conventional methods the coagulum is separated and the separated coagulum may be washed. To provide powder, the coagulum is dried by means known in the art, such as by spray drying or freeze drying.

The properties of the final copolymer depend on the initial ratio of the monomer charge compared to the steady state monomer ratio to determine the copolymer microstructure, as well as the overall comonomer ratio to determine the copolymer macrostructure. What is shown in the Examples below, is that at the same overall 2,3,3,3-tetrafluoropropene/VDF level, changing the comonomer ratio in the initial charge can produce high melting temperature—low crystallinity polymers; or low melting temperature—more highly crystallinity polymers.

In one preferred embodiment, where the ratio of 2,3,3,3-tetrafluoropropene/VDF in the initial charge to the 2,3,3,3-tetrafluoropropene/VDF in the steady state ratio is less than 1, high melting temperature, high melt viscosity polymer with excellent physical properties is produced. The melt viscosity of these polymers is from 0.5 to 60 kilo poise, preferably from 2 to 50 kilo poise, and more preferably from 2-40 kilo poise, as measured by capillary rheometry at 230° C. and 100 sec$^{-1}$ according to method of ASTM-D3835. This high melt temperature was found over a wide range of overall 2,3,3,3-tetrafluoropropene/vinylidene fluoride composition ratios. The Mn/Mw ratio, or polydispersity ratio is lower than from copolymer formed using the same ratio of comonomers in the initial charge and the delayed feed. These copolymers with low crystallinity are high temperature elastomers that can be used in high temperature environments.

By a 2,3,3,3-tetrafluoropropene, vinylidene fluoride copolymer having high melting temperature means that such copolymers have measurably higher melting temperature at a given crystallinity, than copolymers produced according to the prior art. Crystallinity is calculated from the heat of fusion, which in turn is calculated from any endotherms detected in a differential scanning calorimeter (DSC) scan. The melting temperature is assigned to peak of endotherms.

The DSC scan measuring the crystalline content is performed according to ASTM D 451-97 using a Perkin Elmer 7 DSC apparatus with an Intercooler II attachment. The instrument is equipped with a dry box with an $N_2$ purge through the dry box. Specimens of 9 to 10 mg are used and crimped in aluminum pans. The DSC run is performed in a three steps cycle. The cycle is begun at −125° C. followed by a 10° C./min ramp to 210° C. with a 10 minute hold. The sample is then cooled at a rate of 10° C./min to −125° C. and then unheated at the 10° C./min rate to 210° C.

The invention also relates to copolymers where the ratio of 2,3,3,3-tetrafluopropene/VDF in the initial charge to the 2,3,3,3-tetrafluoropropene/VDF in the steady state ratio is greater than 1. The copolymers formed have, low melting temperature, low melt viscosity, and a higher degree of crystallinity. The Mn/Mw ratio, or polydispersity ratio is higher than from copolymer formed using the same ratio of comonomers in the initial charge and the delayed feed. These polymers are useful in coatings—forming a hard coating, yet easily dissolving in solvents to form solutions.

The following examples further illustrate the best mode contemplated by the inventors for the practice of their invention and should be considered as illustrative and not in limitation thereof.

EXAMPLES

To a 1.7 liter agitated-autoclave reactor was added one liter of DI-water along with 1.5 g of non-fluorinated non-ionic block copolymer surfactants of polypropylene glycol-block-polyethylene glycol-block-polypropylene glycol (PLURONIC 31R1 by BASF). The mixture was purged with argon or nitrogen and then heated to desired temperature of 83° C. The reactor was then charged with VDF and 2,3,3,3-tetrafluoropropene on the given ratio (weight ratio: (g of 2,3,3,3-tetrafluoropropene/(g VDF)) to reach desired pressure of 4510 kPa. Initiator solution was an aqueous solution of 1% potassium persulfate (from EMD Chemicals, ACS grade) and 1% sodium acetate trihydrate (from Mallinckrodt Chemicals, ACS grade). A continuous feed of the aqueous initiator solution was added to the reaction to obtain adequate polymerization rate, and the pressure was maintained at 4480 kPa by adding, as needed, VDF and 2,3,3,3-tetrafluoropropene at the specified ratio (g of 2,3,3,3-tetrafluoropropene)/(g of VDF). After the pre-determined amount of VDF in the reactor was reached, the addition of monomers and initiator were stopped, and the reaction was continued until the pressure in the reactor was dropped to 200-300 psi. After cooling to room temperature, the reactor was vented and the latex produced by the reaction was drained into a suitable receiving vessel. The latex was coagulated by conventional methods including freezing. The resin is collected by vacuum filtration and washed and dried in convection oven at 110° C.

Melt viscosity measurements of resin were preformed with a DYNISCO LCR-7000 according to ASTM-D3835 by a capillary rheometry at 230° C. and 100 sec$^{-1}$. Thermal characteristics were measured according to ASTM D 451-97 using a Perkin Elmer 7 DSC apparatus with an Intercooler II attachment.

Emulsions of 2,3,3,3-tetrafluoropropene (yf) and vinylidene fluoride were formed, and the properties measured. The results are found in Tables 1 and 2. Example 10, where the ratio of the comonomers in the initial charge and the feed is equal, is a Comparative Example. The initial charge percent yf is calculated by the weight percent yf/VDF in the initial charge, divided by the weight percent yf/VDF in the steady state.

TABLE 1

| Example | Initial charge/steady state charge | SC (wt %) | $D_p$ (%) | SD (%) |
|---|---|---|---|---|
| 1 | 1/4 | 25.63 | 232.1 | 7.30 |
| 2 | 2/4 | 29.52 | 266.7 | 8.50 |
| 3 | 3/4 | 29.01 | 297.7 | 10.80 |
| 4 | 4/4 (comparative) | 28.94 | 261.8 | 6.60 |
| 5 | 6/4 | 28.64 | 251.3 | 10.20 |
| 6 | 8/4 | 28.00 | 247.1 | 4.00 |

SC: solid content as measured by gravimetry
$D_p$: particle intensity average hydrodynamic diameter as measured by dynamic light scattering
SD: standard deviation of light scattering measurement

TABLE 2

| Ex. | yf content in feed (wt %) | yf content (NMR) (wt %) | Visc. @ 100 s$^{-1}$ | Mw | Mn/Mw | Tm (° C.) | Tg (° C.) | ΔH (J/g) |
|---|---|---|---|---|---|---|---|---|
| 7 | 33.3 | 31.5 | 1779.2 | 354,200 | 5.6 | 151.5 | −16.6 | 7.2 |
| 8 | 33.3 | 29.7 | 2017.2 | 392,800 | 5.1 | 151.0 | −15.4 | 7.4 |
| 9 | 33.3 | 31.2 | 1978.5 | 409,600 | 6 | 149.4 | −17.9 | 7.7 |
| 10 | 33.3 | 31.2 | 1466.9 | 341,600 | 6.2 | 147.4 | −19.6 | 7.0 |
| 11 | 33.3 | 31.0 | 1093.5 | 369,100 | 8.1 | 135.5 | −22.3 | 14.0 |
| 12 | 33.3 | 31.0 | 775.8 | 347,800 | 10.3 | 101.4 | −22.0 | 17.3 | yf content in feed - theoretically calculated from the initial VDF and yf.
yf content (NMR) - as measured by $^{19}$F-NMR.
Viscosity as measured by capillary rheometry at 100 S$^{-1}$ shear and 232° C.
GPC data in DMSO using KYNAR 761 (polyvinylidene fluoride from Arkema) as a secondary standard.
All thermal property data is from DSC, running at a cycle of 10° C./min from −125° C. to 210° C.

What is claimed is:

1. A controlled microstructure copolymer composition comprising a copolymer consisting of from 15 to 65 weight percent of 2,3,3,3-tetrafluoropropene monomer units and 35 to 85 weight percent of vinylidene fluoride monomer units, wherein said copolymer is formed by a semi-batch process in which the weight ratio of 2,3,3,3-tetrafluoropropene to vinylidene fluoride in the initial charge is from 0.1 to 0.75 times, or from 1.5 to 10 times the steady state monomer ratio in the delay feed.

2. The controlled microstructure composition of claim 1, wherein the weight ratio of 2,3,3,3-tetrafluoropropene to vinylidene fluoride in the initial charge is from 0.5 to 0.75 times the steady state monomer ratio in the delay feed.

3. The controlled microstructure copolymer composition of claim 1, wherein said copolymer has a particle size of from 50 to 500 nm.

4. The controlled microstructure copolymer composition of claim 3, wherein said copolymer has a particle size of from 100 to 350 nm.

5. The controlled microstructure copolymer composition of claim 1, wherein said copolymer has a melt viscosity of from 0.5 to 60 kilopoise, as measured by capillary rheometry at 230° C. and 100 sec$^{-1}$ measured according to ASTM-D3835.

6. The controlled microstructure copolymer composition of claim 5, wherein said copolymer has a melt viscosity of from 2 to 50 kilopoise.

7. The controlled microstructure copolymer composition of claim 6, wherein said copolymer has a melt viscosity of from 2 to 40 kilopoise.

8. The controlled microstructure copolymer composition of claim 1, further comprising a non-ionic surfactant and no fluorosurfactant, wherein no fluorosurfactant was used in polymerization of making of said copolymer.

\* \* \* \* \*